United States Patent
Soleimani (10) Patent No.: US 10,045,187 B1
(45) Date of Patent: Aug. 7, 2018

(54) EMERGENCY ACTION SYSTEMS AND METHODS

(71) Applicant: Kastle Systems International LLC, Falls Church, VA (US)

(72) Inventor: Mohammad Soleimani, Potomac, MD (US)

(73) Assignee: KASTLE SYSTEM INTERNATIONAL LLC, Falls Church, VA (US)

( * ) Notice: Subject to any disclaimer, the term of this patent is extended or adjusted under 35 U.S.C. 154(b) by 44 days.

(21) Appl. No.: 15/081,180

(22) Filed: Mar. 25, 2016

(51) Int. Cl.
| | |
|---|---|
| *H04M 11/04* | (2006.01) |
| *H04W 4/90* | (2018.01) |
| *H04W 4/22* | (2009.01) |
| *H04W 4/00* | (2018.01) |
| *H04W 4/02* | (2018.01) |
| *H04M 1/725* | (2006.01) |
| *H04W 4/80* | (2018.01) |

(52) U.S. Cl.
CPC ......... *H04W 4/90* (2018.02); *H04M 1/72541* (2013.01); *H04W 4/008* (2013.01); *H04W 4/023* (2013.01); *H04W 4/22* (2013.01); *H04W 4/80* (2018.02)

(58) Field of Classification Search
CPC ......... H04W 4/22; H04W 4/008; H04W 4/02; G07C 9/00007; G07C 9/00309; G07C 2009/00769
USPC ....................... 455/404.2; 370/338
See application file for complete search history.

(56) References Cited

U.S. PATENT DOCUMENTS

2016/0055692 A1* 2/2016 Trani ................. G07C 9/00007
340/5.61
2016/0337829 A1* 11/2016 Fletcher .................. H04W 4/22

* cited by examiner

*Primary Examiner* — Marcos Batista
(74) *Attorney, Agent, or Firm* — NovoTechIP International PLLC (57) ABSTRACT

A method including receiving a first alert message from a first mobile device via a first short-range wireless transceiver included in a plurality of short-range wireless transceivers installed at respective fixed locations in a facility; determining a first location for the first mobile device based on a location of the first short-range wireless transceiver and a signal strength between the mobile device and the first short-range wireless transceivers; and notifying a responding party that an emergency event occurred at the first location.

15 Claims, 9 Drawing Sheets

EMERGENCY ACTION SYSTEMS AND METHODS

BACKGROUND

It is common, and in some jurisdictions required, for businesses or other enterprises to have concrete emergency action plans and equipment, such as alarm systems and written descriptions of procedures for responding to a fire or other emergency, including evacuation procedures, procedures to be followed by employees who remain to perform critical shutdown operations before evacuating, procedures to account for employees after evacuation, and emergency route assignments. Despite having such plans and equipment in place, in practice an actual emergency event is nevertheless chaotic. For example, from day to day and hour to hour, it can be difficult to be aware of which individuals were in a facility at a time of an emergency, and which of those individuals have not yet evacuated the facility. Also, a number of unplanned situations may arise in an emergency, such as individuals who are unable to evacuate and possibly unable to notify others of their inability to evacuate. Additionally, reliance in fixed installations of alarms and sensors for alerting others to emergency situations can hinder timely and effective response to such situations.

SUMMARY

In a general aspect, a nontransitory computer readable medium including instructions included therein which, when executed by one or more processors included in a mobile device, cause the one or more processors to receive a first user input indicating a user's request for emergency services at the user's location; determine one or more signal strengths associated with one or more short-range wireless transceivers external to the mobile device; transmit, in response to receiving the first user input, a first alert message from the mobile device to a first short-range wireless transceiver included in the one or more short-range wireless transceivers external to the mobile device, wherein the first alert message includes the one or more signal strengths; receive a second alert message indicating an emergency situation at the mobile device from one of the one or more short-range wireless transceivers; and provide a visible or audible notification to a user of the mobile device in response to receiving the second alert message.

Particular implementations may include one or more of the following features. The instructions may further cause the one or more processors to display a map of an area or facility on a display included in the mobile device in response to receiving the second alert message; and display an estimated location of the mobile device on the map.

The instructions may further cause the one or more processors to receive text and/or visual data comprising instructions for the user of the mobile device to perform in response to an emergency indicated by the second alert message; and display, in response to receiving the second alert message, the instructions on a display included in the mobile device.

The instructions may further cause the one or more processors to obtain indications of mobile devices that have entered and/or exited an area or facility; and display, on a display included in the mobile device, a list of evacuees that appear to remain within the area or facility subsequent to issuance of the second alert message.

The instructions may further cause the one or more processors to establish duplex audio communication via the first short-range transceiver.

The instructions may further cause the one or more processors to determine the mobile device has become proximate to a second short-range wireless transceiver; and transmit a presence message from the mobile device to the second short-range wireless transceiver.

The instructions may further cause the one or more processors to transmit, in response to receiving the first user input, the first alert message via a cellular data network or a wifi network.

In a general aspect, a method comprising receiving a first alert message from a first mobile device via a first short-range wireless transceiver included in a plurality of short-range wireless transceivers installed at respective fixed locations in a facility; determining a first location for the first mobile device based on a location of the first short-range wireless transceiver and a signal strength between the mobile device and the first short-range wireless transceivers; and notifying a responding party that an emergency event occurred at the first location.

Particular implementations may include one or more of the following features. The plurality of short-range wireless transceivers may each include respective Bluetooth transceivers, and the first alert message may be received from the mobile device via Bluetooth communication.

The method may further comprise determining a second mobile wireless device, different than the first mobile device, is located at the facility; and transmitting, in response to receiving the first alert message, a second alert message indicating an emergency event occurred at the facility to the second mobile device via a second short-range wireless transceiver included in the plurality of short-range wireless transceivers.

The method may further comprise identifying a second mobile device as being assigned for on-site emergency response and as being located at the facility; and transmitting, in response to receiving the first alert message, a second alert message indicating an emergency event occurred at the first location to the second mobile device via a second short-range wireless transceiver included in the plurality of short-range wireless transceivers.

The method may further comprise receiving, after receiving the first alert message, a proximity message from a second mobile device via a second short-range wireless transceiver included in the plurality of short-range wireless transceivers; and determining the second mobile wireless device has left the facility or an area of the facility in response to receiving the proximity message.

The method may further comprise determining a second mobile device is located at the facility; determining a second location for the second mobile device; determining, in response to receiving the first alert message, an evacuation route or egress point from the facility based on the second location; and transmitting a map of the facility or an area of the facility and the determined evacuation route or egress point to the second mobile device for display on the mobile device.

In a general aspect, a method comprising determining that an emergency event has occurred at a facility based on input received from one or more alarm sensors installed within the facility; determining, based on a first message received from a first wireless mobile device via a first short-range wireless transceiver installed within the facility, that the first mobile wireless device is located within the facility during the emergency event; and transmitting, in response to the determination that the emergency event has occurred and the determination that the first mobile wireless device is located within the facility during the emergency event, a first alert message indicating the emergency event occurred to the first mobile device via a second short-range wireless transceiver installed within the facility.

Particular implementations may include one or more of the following features. The first and second of short-range wireless transceivers may each include respective Bluetooth transceivers, and the first alert message may be received from the mobile device via Bluetooth communication.

The method may further comprise receiving a second message transmitted by the first wireless mobile device via a third short-range wireless transceiver installed near an exit of the facility or installed outside of the facility; and determining that a user associated with the first wireless mobile device has successfully evacuated the facility in response to the receipt of the second message.

The method may further comprise causing an alert to be presented on a display included in the first wireless mobile device, wherein the alert instructs a user of the first wireless mobile device to evacuate the facility. The method may further comprise receiving a second message transmitted by the first wireless mobile device via a third short-range wireless transceiver installed within the facility; determining, based on the received second message, a location of the first wireless mobile device within the facility; determining an evacuation route or egress point from the facility based on the determined location; and transmitting a map of the facility or an area of the facility and the determined evacuation route or egress point to the first mobile device for display on the first mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
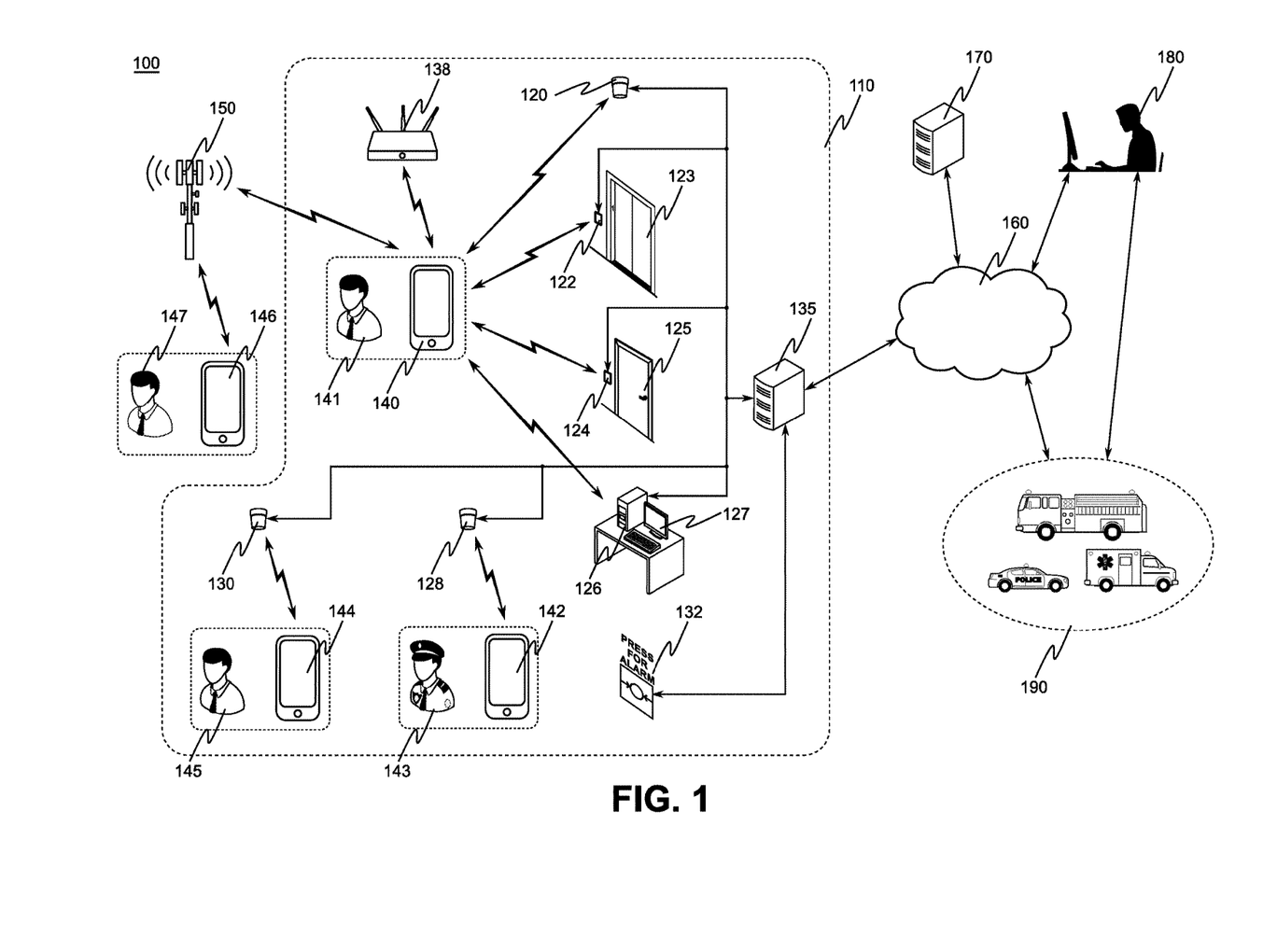
FIG. 1 illustrates an example of an emergency action system for a facility.

FIG. 1 illustrates an example of an emergency action system 100 for a facility 110. Facility 110 may comprise, for example, one or more buildings or other structures, each of which may comprise one or more rooms, enclosed areas, or unenclosed areas. In some cases, facility 110 may be a campus with, for example, a plurality of buildings or other structures in proximity to one another. Entry and/or exit to portions of facility 110 or resources provided within facility 110 may be controlled by access control devices such as secured elevator 123 (with a respective short-range wireless transceiver 122), secured door 125 (with a respective short-range wireless transceiver 124), and secured computer station 127 (which includes a respective short-range wireless transceiver 126). Wireless mobile device 140, which is associated with and used by user 141, is configured to interact with such access control devices to allow user 141 to obtain access to the areas and/or resources that they control. Such interaction may be performed, at least in part, in response to program instructions included in an application program installed on wireless mobile device 140. Examples of use of wireless mobile devices for obtaining access via such access control devices are described in U.S. patent application Ser. No. 14/985,523, entitled "Hands-Free Access Control," and filed on Dec. 31, 2015, which is incorporated herein by reference in its entirety. There may be other wireless mobile devices, and associated users, that are also configured to permit access to areas of, and/or resources within, facility 110, such as wireless mobile device 142, which is associated with and used by user 143, wireless mobile device 144, which is associated with and used by user 145, and wireless mobile device 146, which is associated with and used by user 147. Alert control server 135 is configured to communicate with the short-range wireless transceivers 122, 124, and 126 (although such communication may be indirect, such as via an intervening access control server), such as to perform authentication and/or tracking of accesses granted to wireless mobile device 140 throughout facility 110.

In this disclosure, the term "short-range wireless" refers to radio frequency (RF) based communication systems with a typical operating range of 30 meters or less. Examples include Bluetooth and Bluetooth Low Energy (BLE). For example, although wireless mobile device 140 may communicate with and via wireless access point 138 and cellular base station 150, for the purpose of this description, they are not, without further limitations, considered to be "short-range wireless" communication units. The term "short-range wireless" may also encompass communication units that are capable of communicating with wireless mobile devices that are more than 30 meters away, but are configured to limit their interactions to devices within a range of 30 meters or less. In a hypothetical example, short-range wireless transceiver 122 and wireless mobile device 140 may be able to exchange data at a range of 15 meters (for example, at the media layers 1-3 of the OSI (Open Systems Interconnection) model), but short-range wireless transceiver 122 and wireless mobile device 140 may be configured, such as via software executing thereon, to require a minimum signal strength before engaging in protocol exchanges (for example, at layers 5-7 of the OSI model) wherein in effect the operating range between short-range wireless transceiver 122 and wireless mobile device 140 is 10 meters or less.

In addition to the short-range wireless transceivers 122, 124, and 126 associated with access control, facility also includes short-range wireless transceivers 120, 128, and 130. The particular examples illustrated in FIG. 1 are ceiling-mounted units, although other embodiments may be used. Short-range wireless transceivers 120, 128, and 130 are not necessarily used in connection with access control. But are configured to receive "presence messages" from wireless mobile device 140 (as well as other wireless mobile devices, such as wireless mobile devices 142, 144, and 146), which allow system 100 to record that wireless mobile device 140 was in proximity to the receiving short-range wireless transceiver. Short-range wireless transceivers 122, 124, and 126 may also be configured to receive presence messages, or system 100 may be configured to treat messages received in connection with access control as presence messages. Short-range wireless transceivers 120, 128, and 130 are configured to communicate with alert control server 135. In some examples, short-range wireless transceivers 120, 128, and 130 may be configured to broadcast messages advertising their presence to wireless mobile devices.

Short-range wireless transceivers 120, 122, 124, 126, 128, and 132 are each installed at respective fixed locations in facility 110. Thus, when system 100 receives a message from wireless mobile device 140 via one or more of short-range wireless transceivers 120, 122, 124, 126, 128, and 132, system 100 may obtain a location (or locations) of the receiving short-range wireless transceivers (from, for example, a database recording the fixed locations of short-range wireless transceivers 120, 122, 124, 126, 128, and 132 or from location information provided by the short-range wireless transceivers themselves), and estimate a location for wireless mobile device 140. In a first example, a presence message received via short-range wireless transceiver 126 for secured computer station 127 could be used by system 100 to determine that wireless mobile device 140 is located in the same room as secured computer station 127. In a second example, if a message or messages is/are received via short-range wireless transceivers 124 and 128 at approximately the same time, system 100 may be configured to estimate a location for wireless mobile device that is between the locations of short-range wireless transceivers 124 and 128. In some examples, this estimated location may be based on signal strengths between wireless mobile device 140 and short-range wireless transceivers 124 and 128, which may be provided by wireless mobile device 140 or obtained via RSSI (received signal strength indication) information provided by short-range wireless transceivers 124 and 128. In a third example, wireless mobile device 140 may be configured to determine signal strengths between itself and surrounding short-range wireless transceivers, and transmit a message via one of the short-range wireless transceivers indicating the determined signal strengths. In some examples, the observed signal strength may be a simple binary indication that a particular short-range wireless transceiver is proximate to mobile wireless device 140. In some examples, some or all of short-range wireless transceivers 120, 122, 124, 126, 128, and 132 may be included in a mesh network, in which a short-range wireless transceiver may transmit data to or from a wireless mobile device via a neighboring short-range wireless transceiver. In some examples, wireless mobile device 140 may be configured to estimate its own location based on signals received from one or more short-range wireless transceivers 120, 122, 124, 126, 128, and 132. Such signals may include, for example, two- or three-dimension coordinates indicating a location of a transmitting short-range wireless transceiver within a building or facility, to facilitate location estimation by wireless mobile device 140.

Facility 110 also includes alarm sensors 132 for detecting emergency conditions, such as, but not limited to, heat detectors, smoke detectors, intrusion detectors, manual pull stations, and pushbutton stations. The alarm sensors 132 provide input to alert control server 135. Alert control server 135 may be configured to determine, based on signals received from the alarm sensors or wireless mobile devices 140, 142, and 144, when, and what type of, an emergency event has occurred. Additionally, alert control server 135 may be configured to determine when, and what type of, an emergency event has occurred based on input received via wide area network 160 (for example, a hazardous material related or weather related emergency event local to a facility may result in determining an emergency event has occurred for one or more facilities). Examples of wide area network 160 include, but are not limited to, the Internet and a company-operated network linking multiple facilities.

Wireless mobile device 140, as well as mobile devices 142, 144, and 146, may be configured to communicate via wireless access point 138 (included in facility 110) and/or cellular base station 150. For example, wireless mobile device 146 may be used to send or receive messages relating to an emergency event via cellular base station 150 during a time that wireless mobile device 146 is away from facility 110. As another example, wireless mobile device 140 may be configured to send and/or receive a single alert message via multiple communication channels, when communication is possible via more than one channel, in order to ensure delivery and/or receipt of the alert message. As a result, an alert message initiated by user 141 may be transmitted to alert control server 135 via all three of short-range wireless transceiver 122, wireless base station 138, and cellular base station 150.

Alert control server 135 may be configured to associate various roles and/or responsibilities with various users and/or the wireless mobile devices associated with each respective user. These responsibilities may vary depending upon the type of emergency event. In the example illustrated in FIG. 1, user 143 is designated as an on-site responder for security-, medical-, and fire-related emergency events, and user 145 is designated (for example, in a database maintained by or accessible to alert control server 135) as an evacuation coordinator responsible for coordinating evacuation of a portion of facility 110. Specific roles or responsibilities assigned to users may be dynamically assigned according to their presence and/or location within the facility as determined at or during the time of an emergency. As a first example, user 145 may ordinarily be designated evacuation coordinator for a second floor of facility 110 and user 147 as evacuation coordinator for a third floor of facility 110. However, if, as illustrated in FIG. 1, user 147 is not present at facility 110 at the time of an emergency event, alert control server 135 may be configured to determine that user 147 (by way of wireless mobile device 146) is not present at facility 110, and in response to that determination automatically and dynamically designate user 145 as evacuation coordinator for both the second and third floors, and notify user 145 of the change in responsibilities via wireless mobile device 144. As a second example, user 143 may be selected as a primary on-site responder for an emergency event, such as a small fire or medical emergency, rather than another user also designated as a potential on-site responder, based on user 143 being the closest potential on-site responder to the location determined for the emergency event.

Alert control server 135 may be configured to communicate with an alert management server 170 via wide area network 160. Alert management server 170 may be configured to coordinate responses to an emergency event across multiple facilities, and/or may perform some of the functions described for alert control server 135, such as, but not limited to, dynamically assigning roles and/or responsibilities to users. Alert control server 135 and/or alert management server 170 may be configured to notify and interact with offsite operator 180. Alert control server 135 and/or alert management server 170 may provide network communication interfaces that allow offsite operator 180 to be notified of a possible or actual emergency event, determine whether a detected emergency event should result in evacuation of all of part of facility 110, track progress of an evacuation and/or on-site response to an emergency event, and/or modify roles and/or responsibilities of users. Offsite emergency responders 190 may be contacted by offsite operator 180 or automatically contacted by alert control server 135 and/or alert management server 170 to indicate an emergency event has occurred at facility 110.

Based on locations it has determined for wireless mobile devices, alert control server 135 may be configured to keep track of which wireless mobile devices are within facility 110, where wireless mobile devices are located within facility 110, and/or determine when and/or where wireless mobile devices successfully exit facility 110 or areas included in facility 110. For example, alert control server 135 may determine that user 141 has successfully evacuated facility 110 based on receiving a presence message from wireless mobile device 140 via a short-range wireless transceiver installed near an exit of facility 110 or installed outside of facility 110. Additionally, a short-range wireless transceiver may be installed at an assembly point for evacuees, in order to facilitate determining when a user associated with a wireless mobile device has been safely evacuated. Alert control server 135 may also be configured to process presence messages collected via the short-range wireless transceivers installed in facility 110 to determine locations of wireless mobile devices within facility 110 and whether, when, and where a wireless mobile device exited facility 110. Based on this, alert control server 135 can generate and provide lists of users who do not yet appear to have exited facility 110 or an area of facility 110. Such lists may be transmitted by alert control server 135 to wireless mobile devices, such as wireless mobile device 144 for evacuation coordinator 145, which may be displayed on wireless mobile device 144 as a checklist of evacuees that evacuation coordinator 145 needs to ensure safely evacuated facility 110.

In addition to their use for reporting and responding to actual emergencies, the features described in this disclosure may also be used to perform emergency response practice drills. During such practice drills, an indication may selectively be provided to users, such as users 141, 143, 145, and 147, that a practice drill is being performed. A practice drill may be limited to a portion of facility 110 and/or a portion of the users therein. For example, a practice drill may be performed only for one floor or a multi-floor facility. Additionally, an evacuation prompted by an actual emergency event may only be performed portion of facility 110 and/or a portion of the users therein.

Figure 2A:
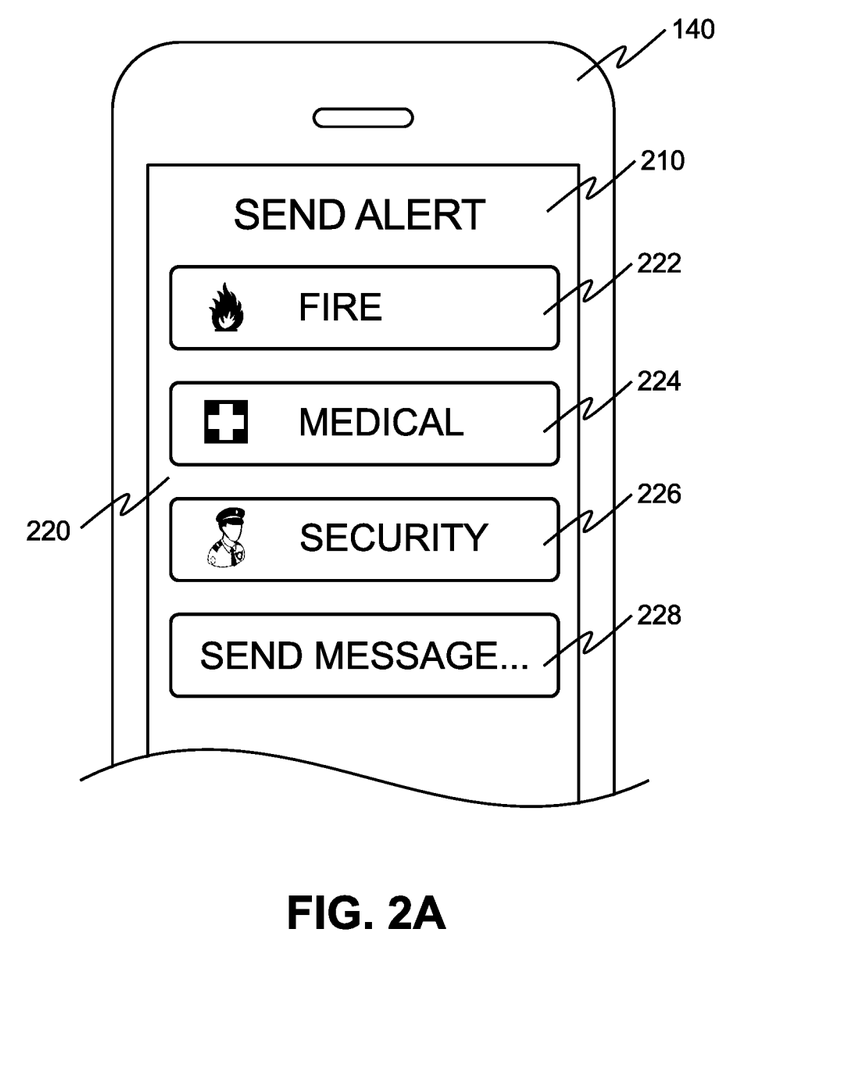
FIG. 2A illustrates an example of a user interface that may be provided on a wireless mobile device for sending an alert message indicating an occurrence of an emergency event.

FIG. 2A illustrates an example of a user interface 220 that may be provided on wireless mobile device 140 for sending an alert message indicating an occurrence of an emergency event. Wireless mobile device 140 is configured, such as by way of program instructions executing on wireless mobile device 140, to present on display 210 of wireless mobile device 140 graphical user interface 220 for sending an alert message to alert control server 135 and for a user of wireless mobile device 140 to indicate what type of emergency event is to be indicated in the alert message. In the particular example illustrated in FIG. 2A, three types of emergency events may be indicated via respective buttons: fire (button 222), medical (button 224), and security (button 226). However, the types of emergency events are not limited to these three types, and may include, for example, a hazardous material event or a catastrophic equipment failure event. In response to receiving a user input indicating selection of one of buttons 222, 224, or 226 (such as a touch screen that detects selection of one of the buttons), wireless mobile device 140 is configured to transmit the alert message to an available short-range wireless transceiver, for handling by alert control server 135. Much as discussed with respect to FIG. 1, the alert message may also be transmitted via other communication channels, such as a wifi base station (for example, a base station compliant with one of the standards defined under IEEE 802.11) or a cellular base station, should such other channels be available. In some examples, an alert message may be transmitted both to an available short-range wireless transceiver and via another communication channel, such as a wifi base station or a cellular base station, to better ensure successful delivery of the alert to alert control server 135. In some facilities or areas of a facility, such other communication channels may not be available, leaving nearby short-range wireless transceivers as the only channel for delivering the alert message.

Wireless mobile device 140 may be configured to determine one or more signal strengths associated with one or more short-range wireless transceivers external to the mobile device. For example, with reference to FIG. 1, wireless mobile device 140 may determine that the two short-range wireless transceivers 120 and 122 are present and determine respective signal strengths, such as via an RSSI measurement provided by a short-range wireless transceiver included in mobile device 140. The alert message mentioned above may include the determined signal strengths. In some examples, short-range wireless transceivers installed in a facility may alternatively or in addition determine signal strengths associated with mobile device 140 and provide signal strength information to alert control server 135. As discussed previously, alert control server 135 may be configured to determine a location for wireless mobile device 140 based on the signal strengths associated with wireless mobile device 140.

In response to the alert message received from wireless mobile device 140, alert control server 135 determines occurrence of the emergency event and a location associated with the emergency event. As noted previously, alert control server 135 may also determine occurrence of an emergency event based on inputs received from alarm sensors 132. In response to determining the occurrence of the emergency event, alert control server 135 may notify a responding party, such as, but not limited to, user 143, offsite operator 180, and/or an offsite emergency responder 190, that the emergency event occurred at the determined location. In response to the alert message from wireless mobile device 140, alert control server 135 may identify other wireless mobile devices located at facility 110, such as wireless mobile devices 142 and 144, and transmitting alert messages to the other wireless mobile devices to inform their respective users that the emergency event has occurred, and what action should be taken in response to the emergency event. Alert control server 135 may transmit the alert messages via short-range wireless transceivers located at facility 110, such as short-range wireless transceivers 120, 122, 124, 126, 128, and 130. Alternatively or in addition, alert control server 135 may deliver the alert messages via other communication channels. Additionally, in response to receiving the alert message from wireless mobile device 140, alert control server 135 may activate notification devices, such as but not limited to audible alarm units, and/or safety devices, such as but not limited to fire doors.

Graphical user interface 220 may also include a button 228 for sending a textual message to a responding party. In response to a user input electing button 228, another user interface (not shown) may be provided for sending and receiving messages to and from the responding party. The text messages are delivered via short-range wireless transceivers included in facility 110. In some implementations, wireless mobile device 140 may also be configured to establish and conduct duplex audio communication via short-range wireless transceivers installed in facility 110 to facilitate communication between user 141 and responders.

Figure 2B:
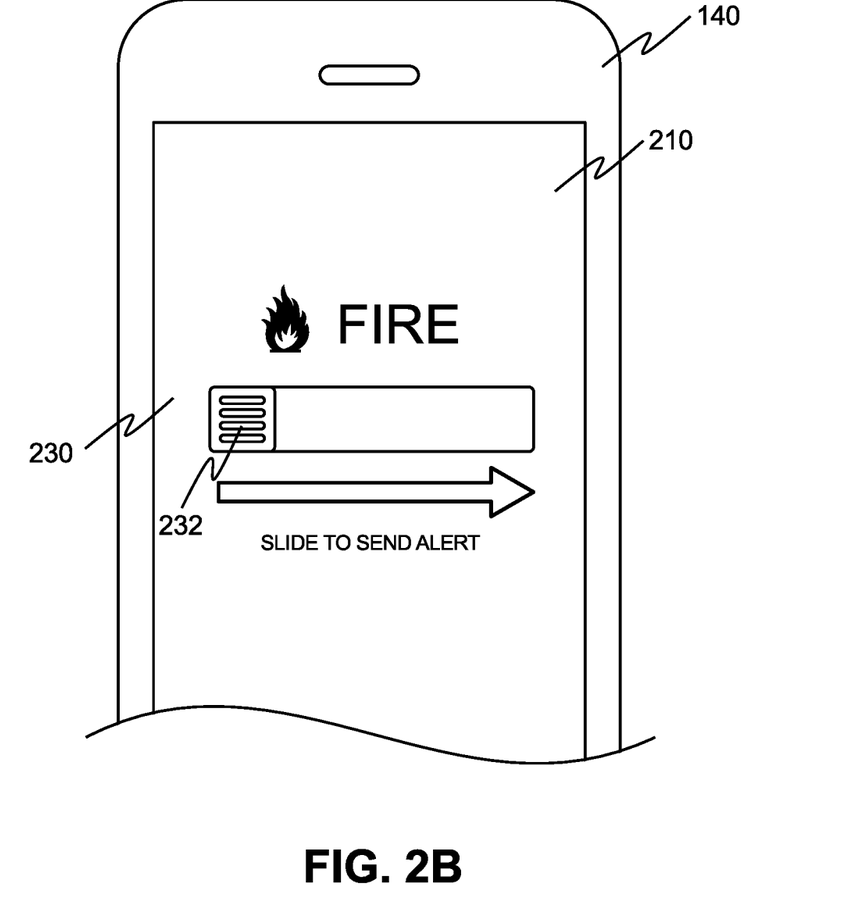
FIG. 2B illustrates an example of a user interface that may be provided on a wireless mobile device for sending an alert message indicating an occurrence of an emergency event.

FIG. 2B illustrates an example of a user interface 230 that may be provided on wireless mobile device 140 for sending an alert message indicating an occurrence of an emergency event. Graphical user interface 230, which is displayed on display 210 of wireless mobile device 140, includes a slider 232 which a user of wireless mobile device must slide across the screen in order for wireless mobile device 140 to send the alert message. Graphical user interface 230 may be displayed in response to selection of button 222 in user interface 220, to confirm the user's intent to send an alert message.

Figure 2C:
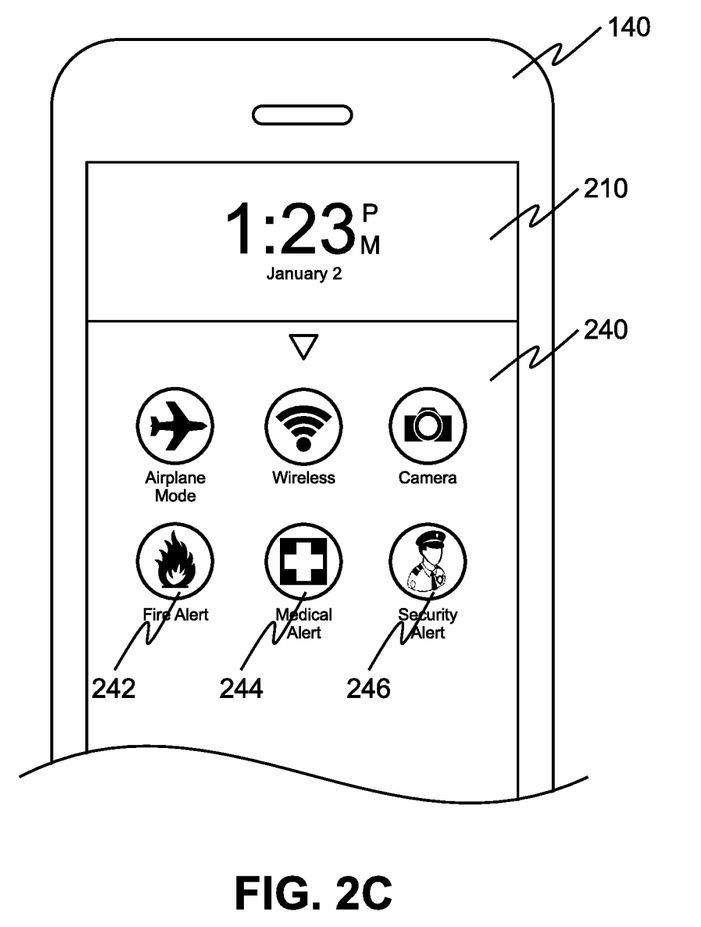
FIG. 2C illustrates a mechanism for transmitting an alert message from a lock screen of a smartphone.

FIG. 2C illustrates a mechanism for transmitting an alert message from a lock screen of a smartphone. In the example illustrated in FIG. 2C, a plurality of widget icons, including widget icons 242, 244, and 246 are displayed in widget portion 240 of a lockscreen interface displayed on display 210 of wireless mobile device 140. In response to a user input selecting of one of widget icons 242, 244, and 246, wireless mobile device 140 is configured to transmit an associated alert message, much as described with respect to buttons 22, 224, and 246 illustrated in FIG. 2A.

Figure 3:
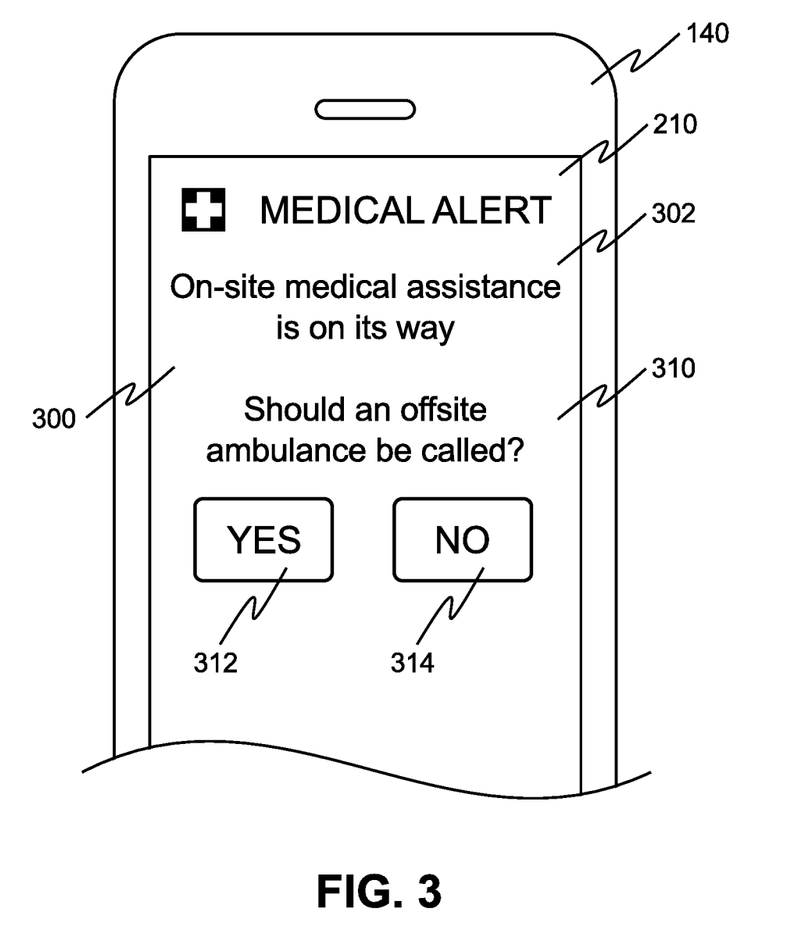
FIG. 3 illustrates an example of a secondary user interface 300 that may be provided on a wireless mobile device after sending an alert message indicating an occurrence of an emergency event.

FIG. 3 illustrates an example of a secondary user interface 300 that may be provided on wireless mobile device 140 after sending an alert message indicating an occurrence of an emergency event. In the particular example illustrated in FIG. 3, mobile wireless device 140 has already transmitted an alert message indicating a medical emergency event has occurred at the location of mobile wireless device 140. In response to the alert message transmitted by wireless mobile device 140, alert control server 135 may transmit a confirmation message to mobile device 140 via a short-range wireless transceiver, such as short-range wireless transceiver 122. In response to receiving the confirmation message, wireless mobile device 140 may be configured to display a confirmation indication 302 on display 210 (in this example, the confirmation indication 302 states that "On-site medical assistance is on its way"). Graphical user interface 300 may include one or more prompts 310 for further information regarding the emergency event. In this particular example, prompt 310 asks the user of wireless mobile device 140 for an indication whether an offsite ambulance should be requested to respond to the emergency event, and two response input elements, "yes" button 312 and "no" button 314, are provided. In response to the user selecting either button 312 or button 314, an event information message may be transmitted to alert control server 135, which may perform various operations in response to the event information message, such as, but not limited to, requesting offsite emergency responders 190, further prompts to be displayed and answered via user interface 300, and/or instructions for responding to the emergency event to be displayed via user interface 300. Although FIG. 3 illustrates a fairly simple example of a prompt 302, more complex prompts may be presented. For example, in an emergency event involving a release of hazardous material, a series of prompts may be provided to identify the material or materials at issue in order to more effectively mount a response to the emergency event.

Figure 4:
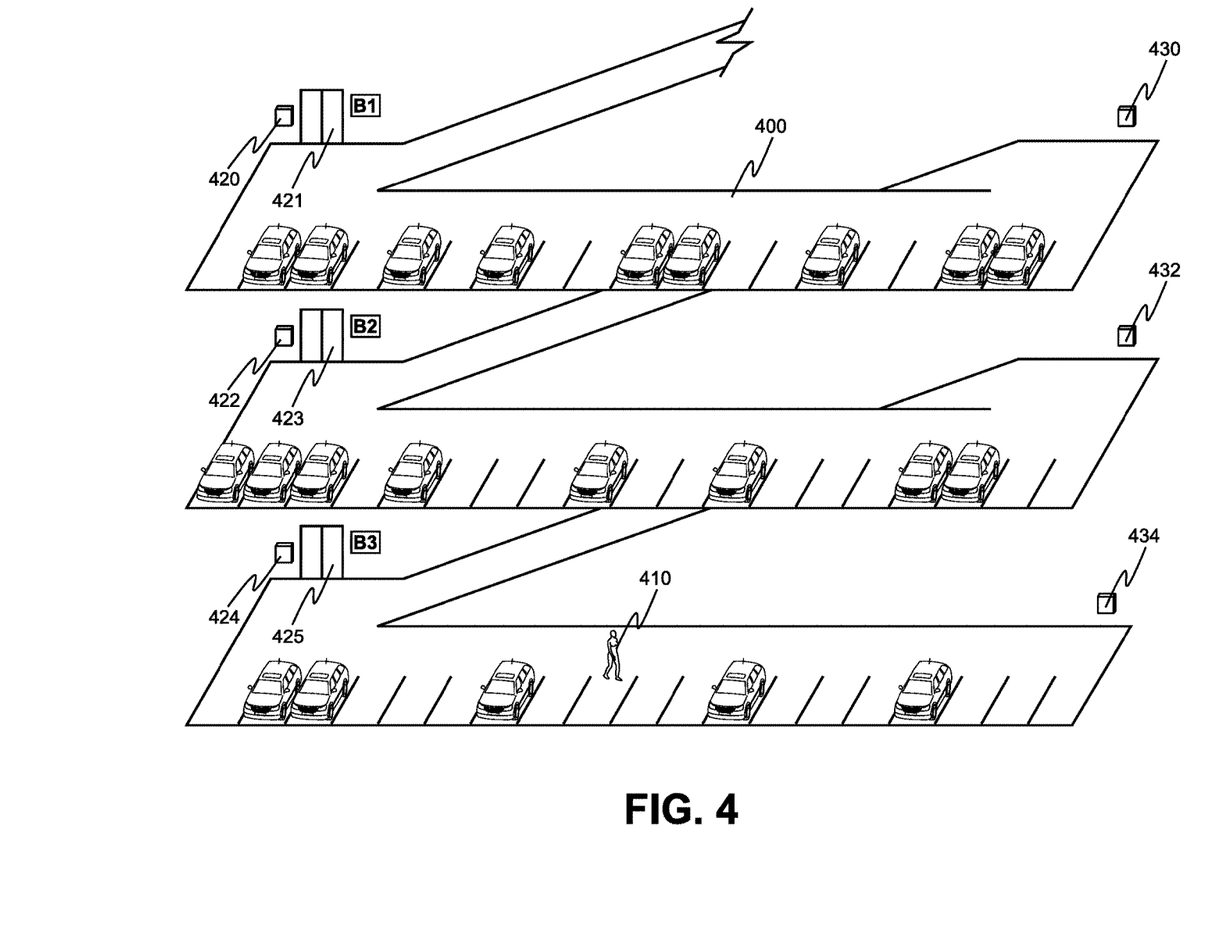
FIG. 4 illustrates an example scenario occurring in a parking garage.

FIG. 4 illustrates an example scenario occurring in a parking garage 400. Garage 400 is typically constructed as part of a larger facility, although in some examples garage 400 may be considered a separate facility. In this particular example, garage 400 is a subterranean parking garage, inside of which there is no cellular data or cellular voice coverage for a wireless mobile device carried by user 410. It is common in such structures for short-range wireless signals to not be able to pass between levels. Garage 400 includes a plurality of short-range wireless transceivers, including short-range wireless transceivers 420, 422, and 424 for gaining access via respective secured doorways 421, 423, and 425, and short-range wireless transceivers 430, 432, and 434. In the event that user 410 wishes to report an emergency event, user 410 may utilize a wireless mobile device on his or her person to transmit an alert message to one or both of short-range wireless transceivers 424 and 434. As a result, an alert control server, such as alert control server 135 in FIG. 1, may determine that an emergency event has occurred for user 410 on level B3 of parking garage 400, and may automatically respond, much as discussed throughout this disclosure.

Figure 5:
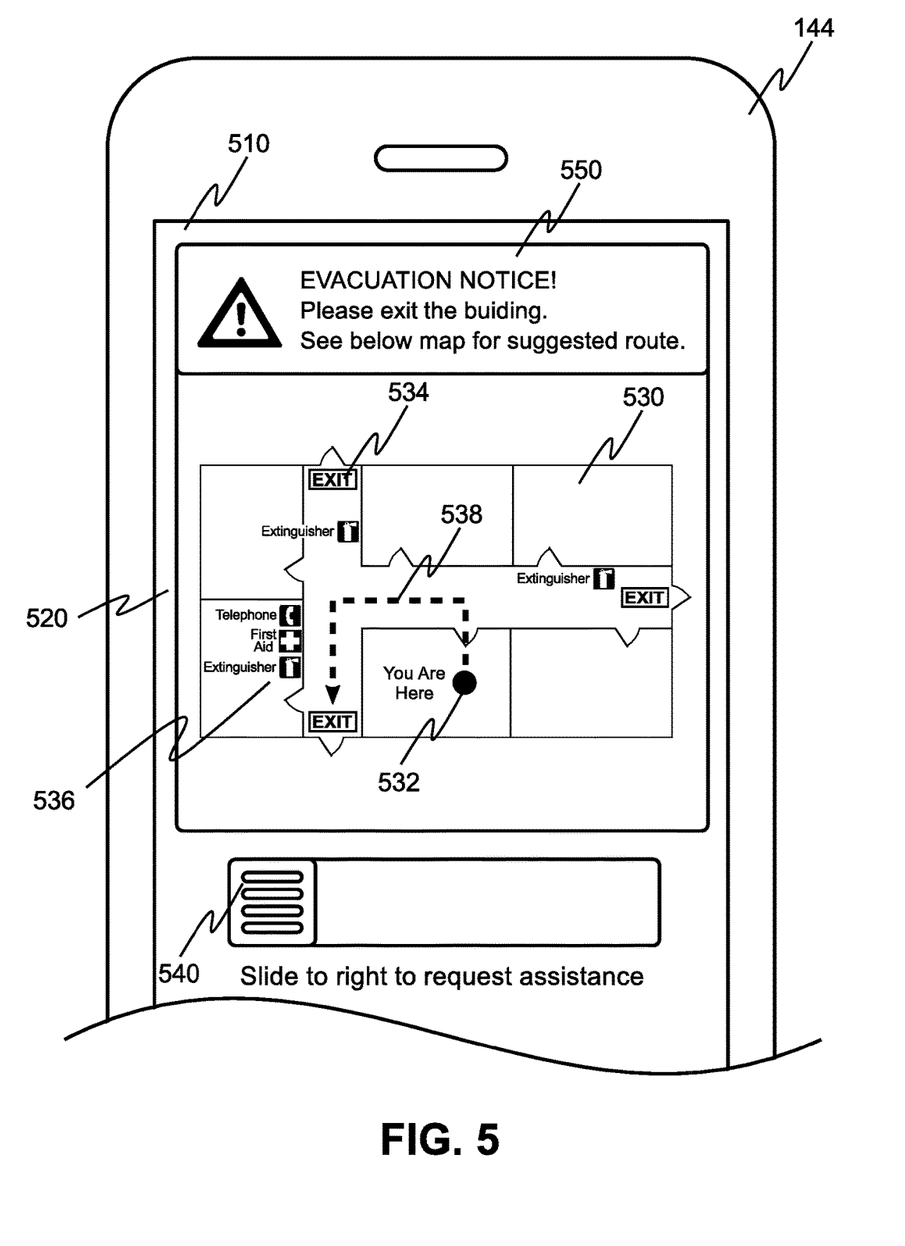
FIG. 5 illustrates an example user interface for a wireless mobile device utilized by an evacuee.

FIG. 5 illustrates an example user interface 520 for a wireless mobile device 144 utilized by an evacuee 145. In this example, in response to user 141 reporting an emergency event via wireless mobile device 140, alert control server 145 sends alert messages via short-range wireless transceivers installed in facility 110 to other wireless mobile devices, and alert control server 135 has determined that wireless mobile device 144 is associated with a user 145 who should be evacuated from facility 110 in response to the emergency event (as noted previously, some users or portions of facility 110 may not be evacuated in response to an emergency event). In response to an alert message received from alert control server 135, wireless mobile device 144 notifies user 145 of the emergency event by displaying graphical user interface 520 on display 510 of wireless mobile device 144, and in some examples generates an alert sound. User interface 520 includes a message portion 550, notifying user 145 about the emergency event and which may include instructions for responding to the emergency event (in this example, user 145 is instructed to evacuate facility 110). Alert control server 135 may also determine a location for mobile device 144, such as via messages received via short-range wireless transceivers installed in facility 110, or a default location, such as an office assigned to user 145. Based on the location determined for wireless mobile device 144, alert control server 135 may retrieve a map of facility 110 or an area of facility 110 (such as a floor of a building). Alert control server 135 may also determine a recommended evacuation route or egress point for user 145. Alert control server 135 may transmit the retrieved map to wireless mobile device 144 for display as map 530 in user interface 520. Alert control server 135 may transmit to wireless mobile device 144, and map 530 may display, the location 532 determined by alert control server 135. Alert control server 135 may transmit to wireless mobile device 144, and map 530 may display, egress points 534 from facility 110. Alert control server 135 may transmit to wireless mobile device 144, and map 530 may display, locations of equipment 536 that may be useful during the emergency event, such as, but not limited to, fire extinguishers, telephones, and first aid kits. Alert control server 135 may transmit to wireless mobile device 144, and map 530 may display, the evacuation route 532 determined by alert control server 135.

In some examples, wireless mobile device 144 may be configured to, in response to receiving an alert message from alert control server 135, begin periodically transmitting presence messages to one or more nearby short-range wireless transceivers. For example, wireless mobile device 144 may begin broadcasting presence messages every 5, 10, 15, 20, 30, 60, 90, or 120 seconds. Based on the presence messages, alert control server 135 may update and/or refine a location determined for wireless mobile device 144. In some examples, changes in a location determined for wireless mobile device 144 may be reflected on map 530 displayed on wireless mobile device 144 (such as by changing a displayed location 532). Additionally, over the course of an emergency event, a recommended evacuation route or egress point for user 145 may be changed, and reflected on map 530, in response to determined changes in a location for wireless mobile device 144 or information obtained about the emergency event (such as, for example, that a particular egress is not available). Alert control server 135 may be configured to record changes in determined locations of wireless mobile devices during an emergency event to allow review, either during or after the emergency event, of a user's progress in evacuating or otherwise moving through facility 110.

User interface 520 may also include user input element 540 (in the illustrated example, a slider element) by which user 145 may request assistance. In response to user input received via user input element 540, wireless mobile device 144 may transmit an alert message to alert control server 135. Alert control server 135 may respond with prompts to obtain further information, much as discussed with respect to FIG. 3.

Figure 6:
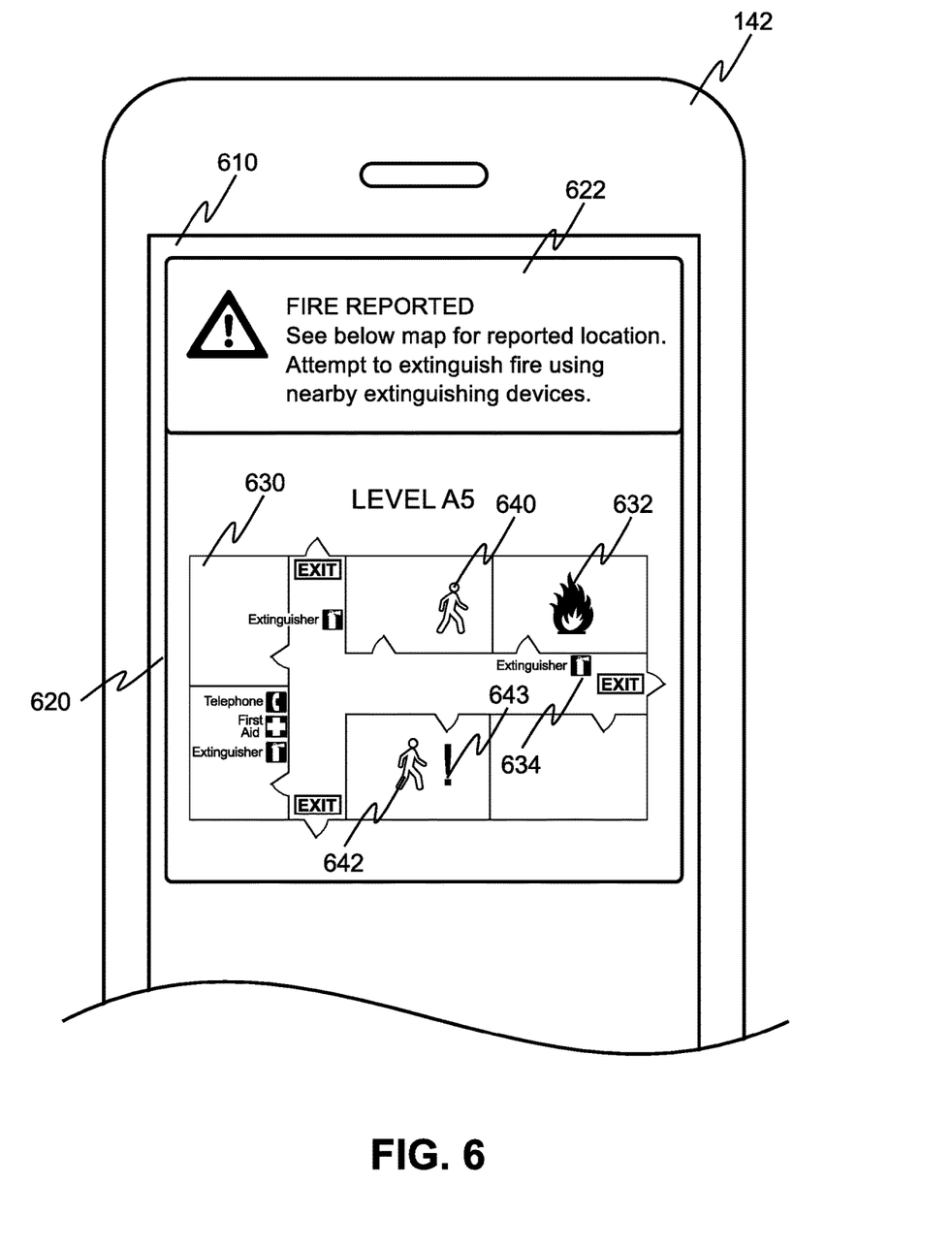
FIG. 6 illustrates an example user interface for a wireless mobile device utilized by an on-site responder.

FIG. 6 illustrates an example user interface 620 for a wireless mobile device 142 utilized by an on-site responder 143. In this example, in response to user 141 reporting an emergency event via wireless mobile device 140, alert control server 145 sends alert messages via short-range wireless transceivers installed in facility 110 to other wireless mobile devices, and alert control server 135 has determined that wireless mobile device 142 is associated with a user 143 who should provide on-site response to the emergency event. In response to an alert message received from alert control server 135, wireless mobile device 142 notifies user 143 of the emergency event by displaying graphical user interface 620 on display 610 of wireless mobile device 142, and in some examples generates an alert sound. User interface 620 includes a message portion 622, notifying user 143 about the emergency event and may include instructions for responding to the emergency event (in this example, user 143 is instructed to attempt to extinguish a fire). Based on a location determined for the emergency event, such as a location determined for a reporting wireless mobile device 140, alert control server 135 may retrieve a map of facility 110 or an area of facility 110 (such as a floor of a building). Alert control server 135 may transmit the retrieved map to wireless mobile device 142 for display as map 630 in user interface 620. Alert control server 135 may transmit to wireless mobile device 142, and map 630 may display, the location of the emergency event determined by alert control server 135. Alert control server 135 may transmit to wireless mobile device 142, and map 630 may display, locations of equipment 634 that may be useful during the emergency event, such as, but not limited to, fire extinguishers, telephones, and first aid kits.

In some examples, wireless mobile device 142 may be configured to display locations of wireless mobile devices (and, in most cases, their associated users) on map 630. In the example illustrated in FIG. 6, two user location indicators 640 and 642 are displayed. If a user has requested assistance, such as via user input element 540 illustrated in FIG. 5, an assistance required indicator 643 may also be displayed. In the example illustrated in FIG. 6, the user associated with user location indicator 640 has requested assistance. In some examples, a user, such as a user with a known disability, may automatically be identified as requiring assistance by alert control server 135. In some examples, additional information about a user can be displayed in user interface 620 in response to selection of a user location indicator or assistance required indicator. For example, identification information for the user or information about the nature of assistance required by a user may be displayed. In some examples, wireless mobile device 142 may be configured to allow, via user interface 620, two-way text- or audio-based communication to be established via a wireless mobile device associated with a displayed user location identifier. In some examples, wireless mobile device 142 may be configured to allow, via user interface 620, two-way text- or audio-based communication to be established with an offsite operator 180, an offsite emergency responder 190, and/or a user assigned a supervisory role for responding to an emergency event. In some examples, user interface 620 may be used to display maps for other areas of facility 110, in order to allow a responder to identify users in need of assistance, routes through facility 110, and locations of resources for responding to the emergency event. In some examples, user interface 620 may be configured to present a listing of users that have not yet been evacuated facility 110, to selectively display their locations within facility 110.

It is noted that for user interfaces 520 and 620, wireless mobile devices 142 and 144 are configured to obtain data from, and provide data to, alert control server 135 and/or alert management server 170. The transfer of such data may be performed via short-range wireless transceivers included in facility 110, or via other communications channels, such as, but not limited to, wireless access point 138 or cellular base station 150.

Figure 7:
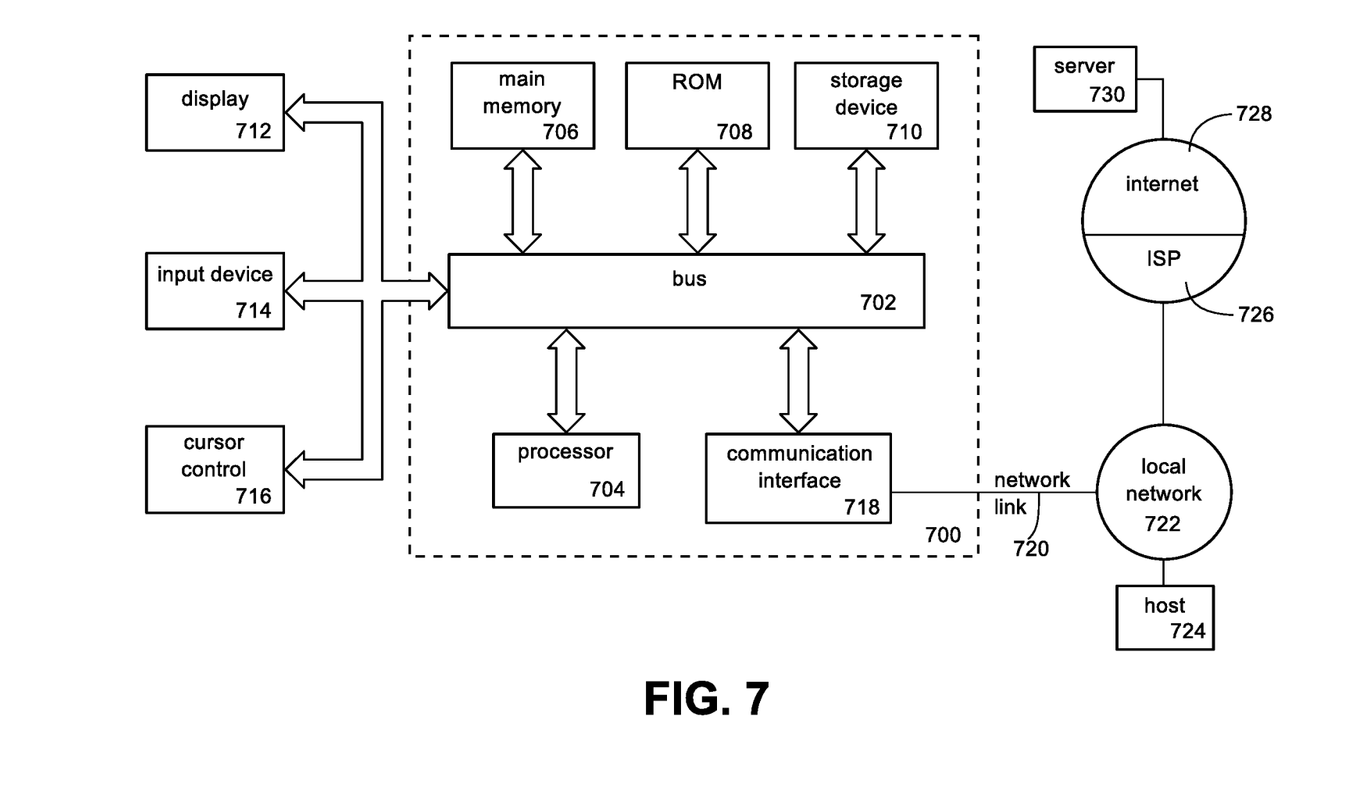
FIG. 7 is a block diagram that illustrates a computer system upon which aspects of this disclosure may be implemented.

FIG. 7 is a block diagram that illustrates a computer system 700 upon which aspects of this disclosure may be implemented, such as, but not limited to wireless mobile devices 140, 142, 144, and 146, alert control server 135, alert management server 170, and short-range wireless transceivers 120, 122, 124, 126, 128, and 130. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Another type of user input device is a touchscreen, which generally combines display 712 with hardware that registers touches upon display 712.

This disclosure is related to the use of computer systems such as computer system 700 for implementing the techniques described herein. In some examples, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A nontransitory computer readable medium including instructions included therein which, when executed by one or more processors included in a mobile device, cause the one or more processors to:
receive a first user input indicating a user's request for emergency services at the user's location;
determine one or more short-range wireless signal strengths between the mobile device and one or more short-range wireless devices configured to transmit short-range wireless signals;
transmit, in response to receiving the first user input, a first message reporting an occurrence of an emergency event from the mobile device, wherein the first alert message includes the one or more signal strengths;
receive a second message indicating occurrence of an emergency event situation at the mobile device; and
provide a visible or audible notification to a user of the mobile device in response to receiving the second alert message.

2. The nontransitory computer readable medium of claim 1, wherein the instructions further cause the one or more processors to:
display a map of an area or facility on a display included in the mobile device in response to receiving the second alert message; and
display an estimated location of the mobile device on the map.

3. The nontransitory computer readable medium of claim 1, wherein the instructions further cause the one or more processors to:
receive text and/or visual data comprising instructions for the user of the mobile device to perform in response to an emergency indicated by the second alert message; and
display, in response to receiving the second alert message, the instructions on a display included in the mobile device.

4. The nontransitory computer readable medium of claim 1, wherein the instructions further cause the one or more processors to:
obtain indications of mobile devices that have entered and/or exited an area or facility; and
display, on a display included in the mobile device, a list of evacuees that appear to remain within the area or facility subsequent to issuance of the second alert message.

5. The nontransitory computer readable medium of claim 1, wherein the instructions further cause the one or more processors to:
determine the mobile device has become proximate to a first short-range wireless transceiver; and
transmit a presence message from the mobile device to the first short-range wireless transceiver.

6. The nontransitory computer readable medium of claim 1, wherein the instructions further cause the one or more processors to transmit, in response to receiving the first user input, the first alert message via a cellular data network or a wifi network.

7. A method comprising:
receiving, at a computer server, a first message from a first mobile device reporting an occurrence of an emergency event at a facility;
receiving a second message from the first mobile device including a short-range wireless signal strength between the first mobile device and a first short-range wireless device included in a plurality of short-range wireless devices installed at respective fixed locations in the facility;
determining a first location within the facility for the first mobile device based on a location of the first short-range wireless device and the signal strength included in the received second message; and
notifying, in response to receiving the first message, a responding party that an emergency event occurred at the first location determined for the first mobile device, wherein the determination that the first mobile wireless device is located within the facility at the time of the emergency event is determined based on a location of the first short-range wireless device and the signal strength included in the second message.

8. The method of claim 7, wherein the short-range wireless signal strength is for a Bluetooth communication.

9. The method of claim 7, further comprising:
determining a second mobile wireless device, different than the first mobile device, is associated with a user who should be evacuated from the facility in response to the emergency event; and
transmitting, in response to receiving the first alert message, a second alert message indicating an emergency event occurred at the facility to the second mobile device.

10. The method of claim 7, further comprising:
identifying a second mobile wireless device as being assigned for on-site emergency response and as being located at the facility; and
transmitting, in response to receiving the first message, a second message indicating an emergency event occurred at the first location to the second mobile device.

11. The method of claim 7, further comprising:
receiving, after receiving the first message, a proximity message from a second mobile device via a second short-range wireless transceiver included in the plurality of short-range wireless transceivers; and
determining the second mobile wireless device has left the facility or an area of the facility in response to receiving the proximity message.

12. The method of claim 7, further comprising:
determining a second mobile device is located at the facility;
determining a second location within the facility for the second mobile device;
determining, in response to receiving the first message, an evacuation route or egress point from the facility based on the second location; and
transmitting a map of the facility or an area of the facility and the determined evacuation route or egress point to the second mobile device for display on the mobile device.

13. A method comprising:
determining that an emergency event has occurred at a facility based on input received from one or more alarm sensors installed within the facility;
identifying a portion of the facility to be evacuated in response to the emergency event;
determining, based on a first message received from a first wireless mobile device, that the first mobile wireless device is located within the identified portion of the facility at the time of the emergency event; and
causing, in response to the determination that the first wireless mobile device is located within the facility at the time of the emergency event, an alert to be presented on a display included in the first wireless mobile device, wherein the alert instructs a user of the first wireless mobile device to evacuate the facility, wherein
the first message includes a short-range wireless signal strength between the first mobile device and a first short-range wireless device included in a plurality of short-range wireless devices installed at respective fixed locations in the facility, and
the determination that the first mobile wireless device is located within the facility at the time of the emergency event is determined based on a location of the first short-range wireless device and the signal strength included in the second message.

14. The method of claim 13, further comprising:
receiving a second message from the first wireless mobile device including a short-range wireless signal strength between the first wireless mobile device and a second short-range wireless device installed near an exit of the facility or installed outside of the facility; and
determining that a user associated with the first wireless mobile device has successfully evacuated the facility in response to the receipt of the second message.

15. The method of claim 13, further comprising:
receiving a second message from the first wireless mobile device including a short-range wireless signal strength between the first wireless mobile device and a second short-range wireless device included in the plurality of short-range wireless devices;
determining, based on a location of the second short-range wireless device and the signal strength included in the received second message, a location of the first wireless mobile device within the facility;
determining an evacuation route or egress point from the facility based on the determined location; and
transmitting a map of the facility or an area of the facility and the determined evacuation route or egress point to the first mobile device for display on the first mobile device.

* * * * *